Figure 1:
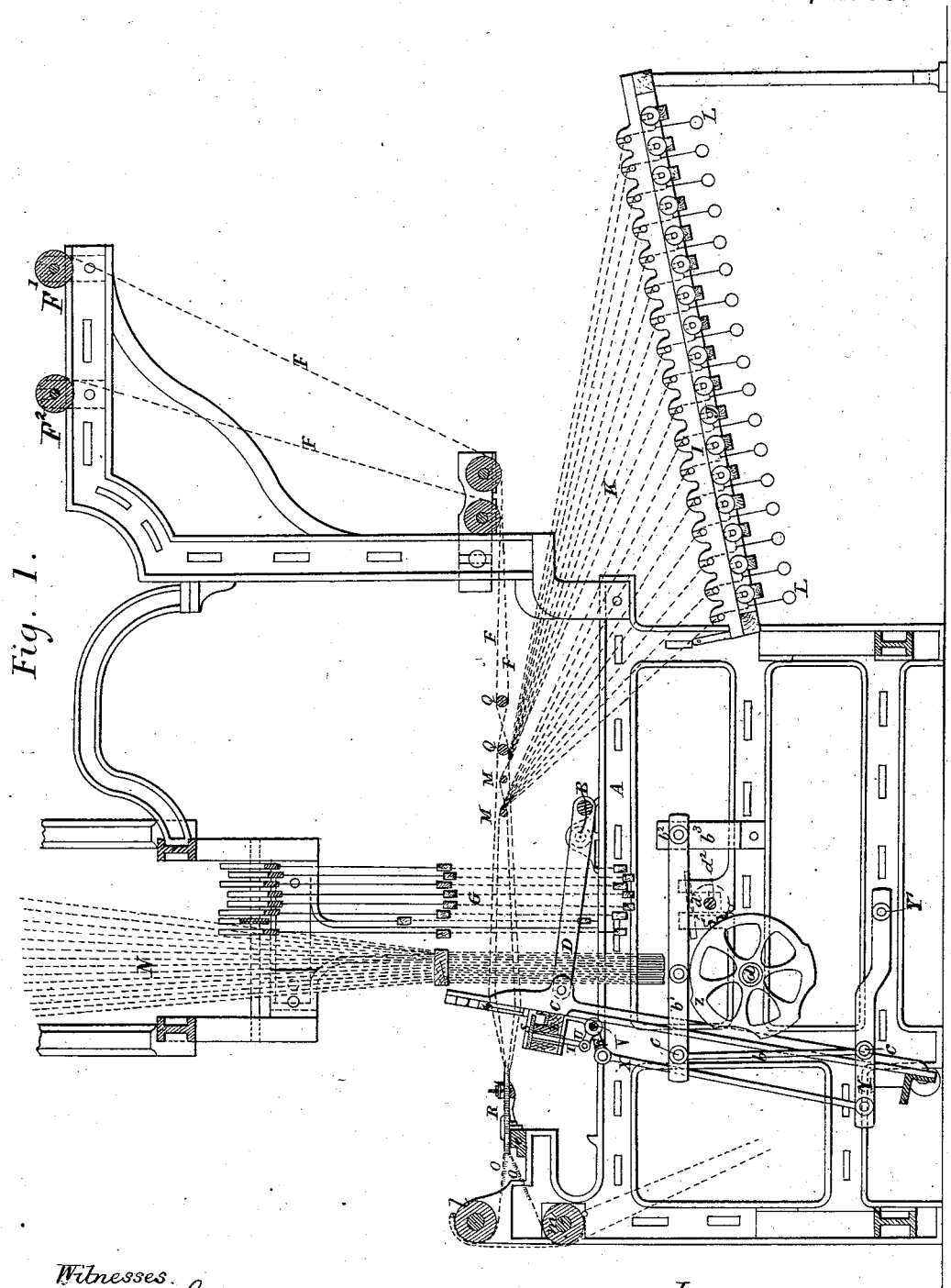

(No Model.) 9 Sheets—Sheet 1.

S. C. LISTER & J. REIXACH.
POWER LOOM FOR WEAVING FIGURED DOUBLE PILE FABRICS.

No. 289,671. Patented Dec. 4, 1883.

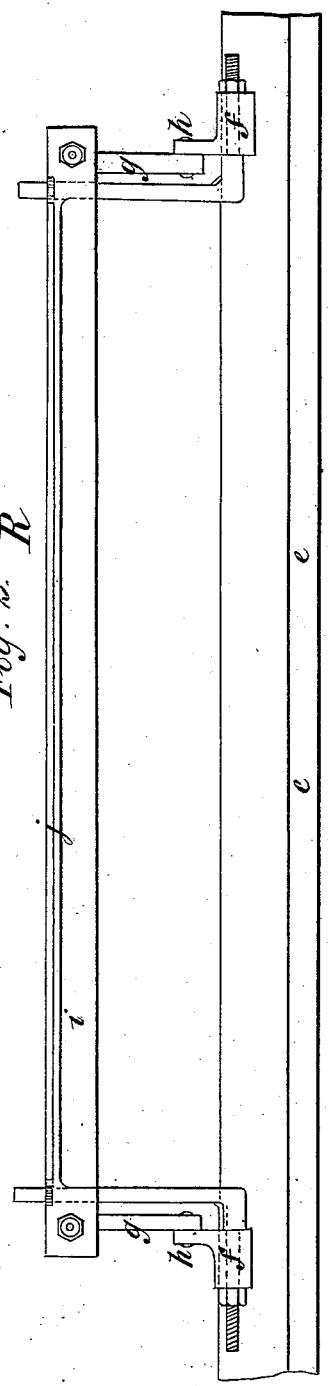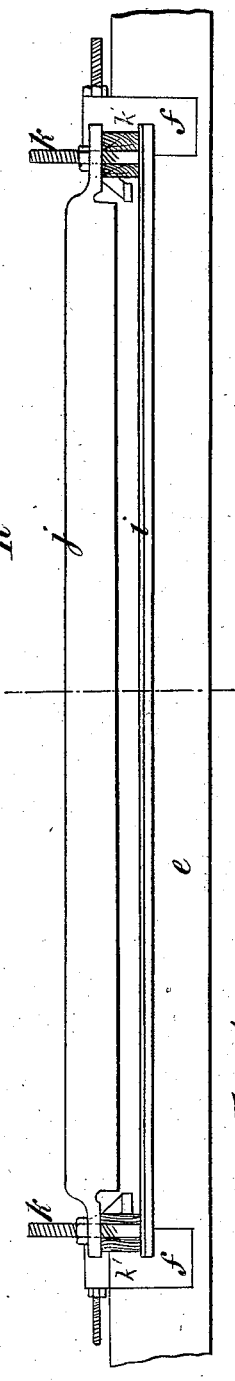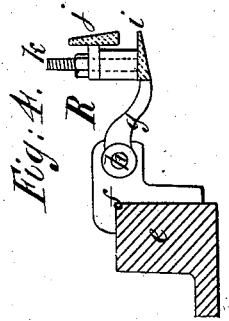

(No Model.) 9 Sheets—Sheet 3.

S. C. LISTER & J. REIXACH.
POWER LOOM FOR WEAVING FIGURED DOUBLE PILE FABRICS.

No. 289,671. Patented Dec. 4, 1883.

Witnesses
Nellie H. Holmes.
Eugene Brown.

Inventors:
S. C. Lister
José Reixach
by their attorneys
Baldwin, Hopkins & Peyton.

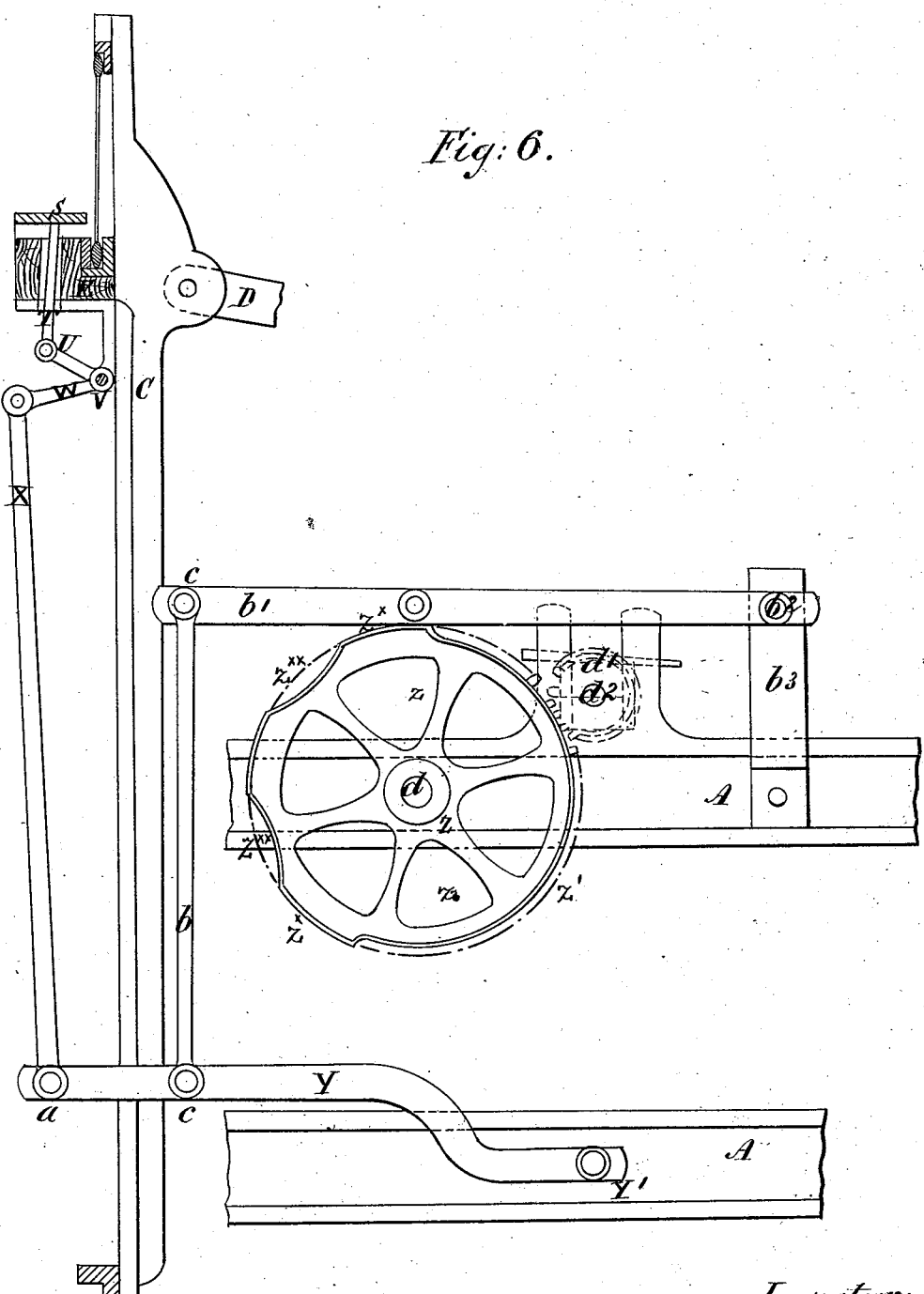

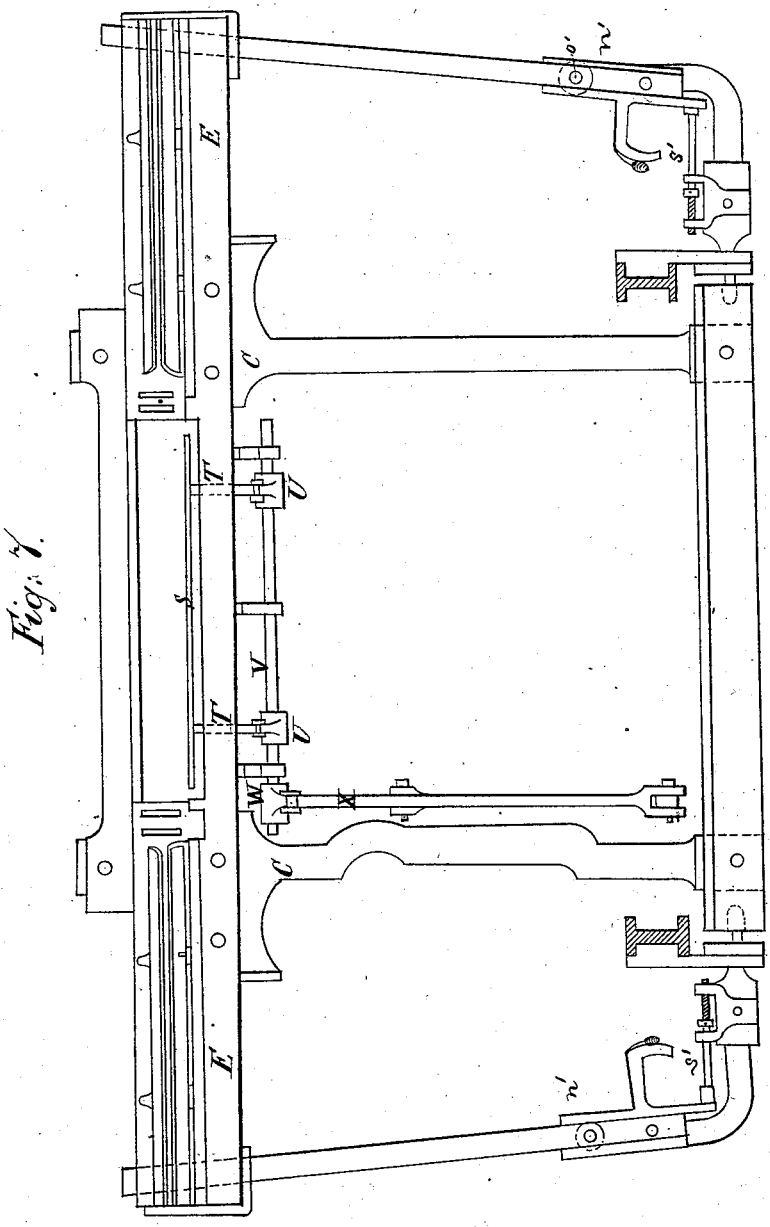

(No Model.) 9 Sheets—Sheet 6.
S. C. LISTER & J. REIXACH.
POWER LOOM FOR WEAVING FIGURED DOUBLE PILE FABRICS.
No. 289,671. Patented Dec. 4, 1883.
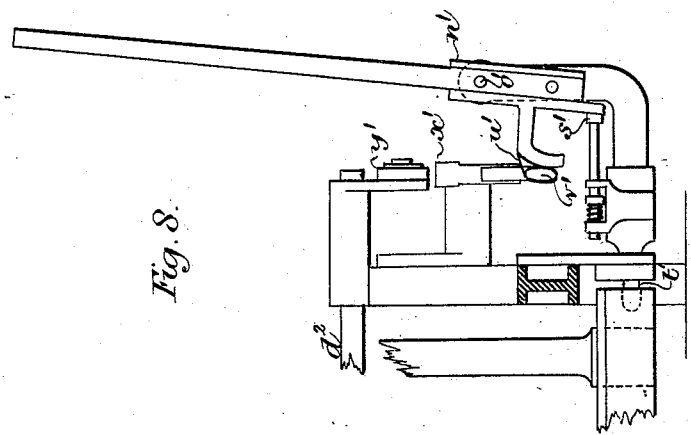
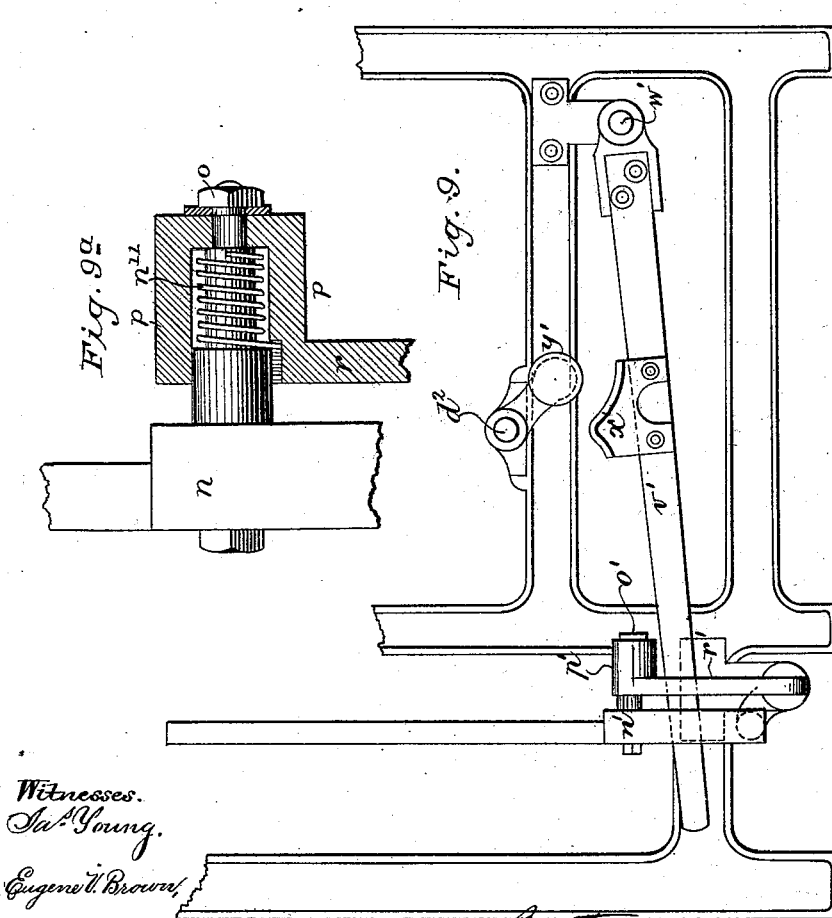
Witnesses.
Jas. Young.
Eugene T. Brown.
Inventors
S. C. Lister,
José Reixach.

(No Model.) 9 Sheets—Sheet 7.
S. C. LISTER & J. REIXACH.
POWER LOOM FOR WEAVING FIGURED DOUBLE PILE FABRICS.
No. 289,671. Patented Dec. 4, 1883.
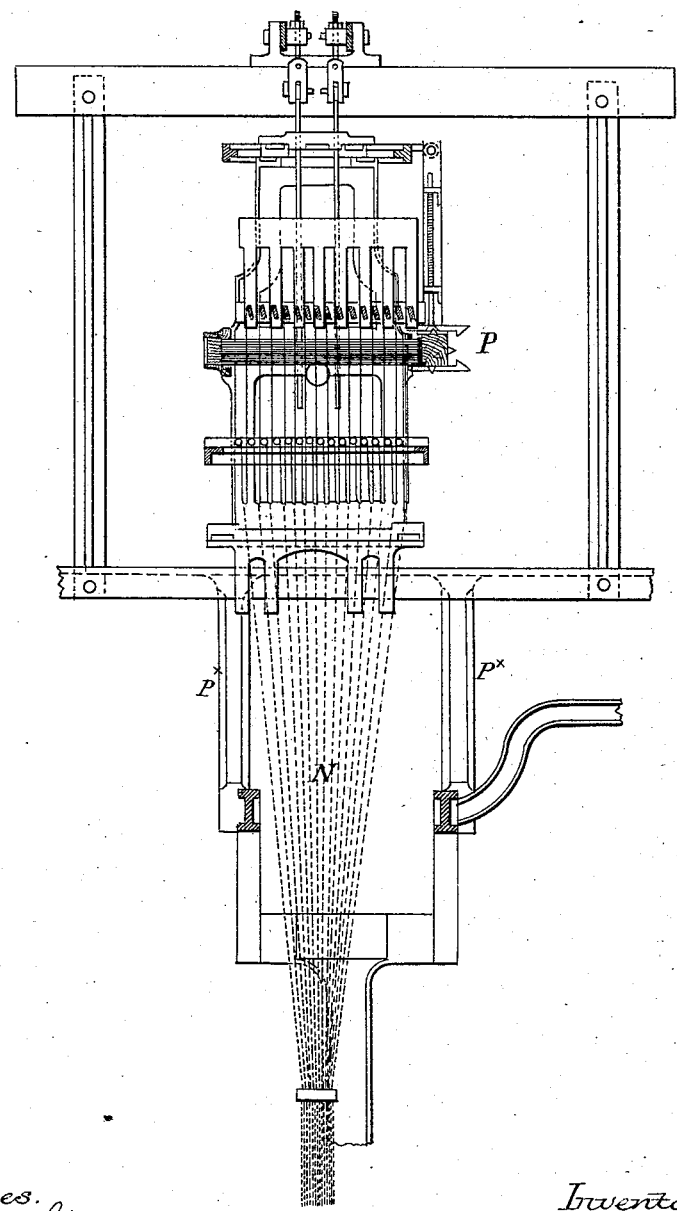
Fig. 1ˣ.

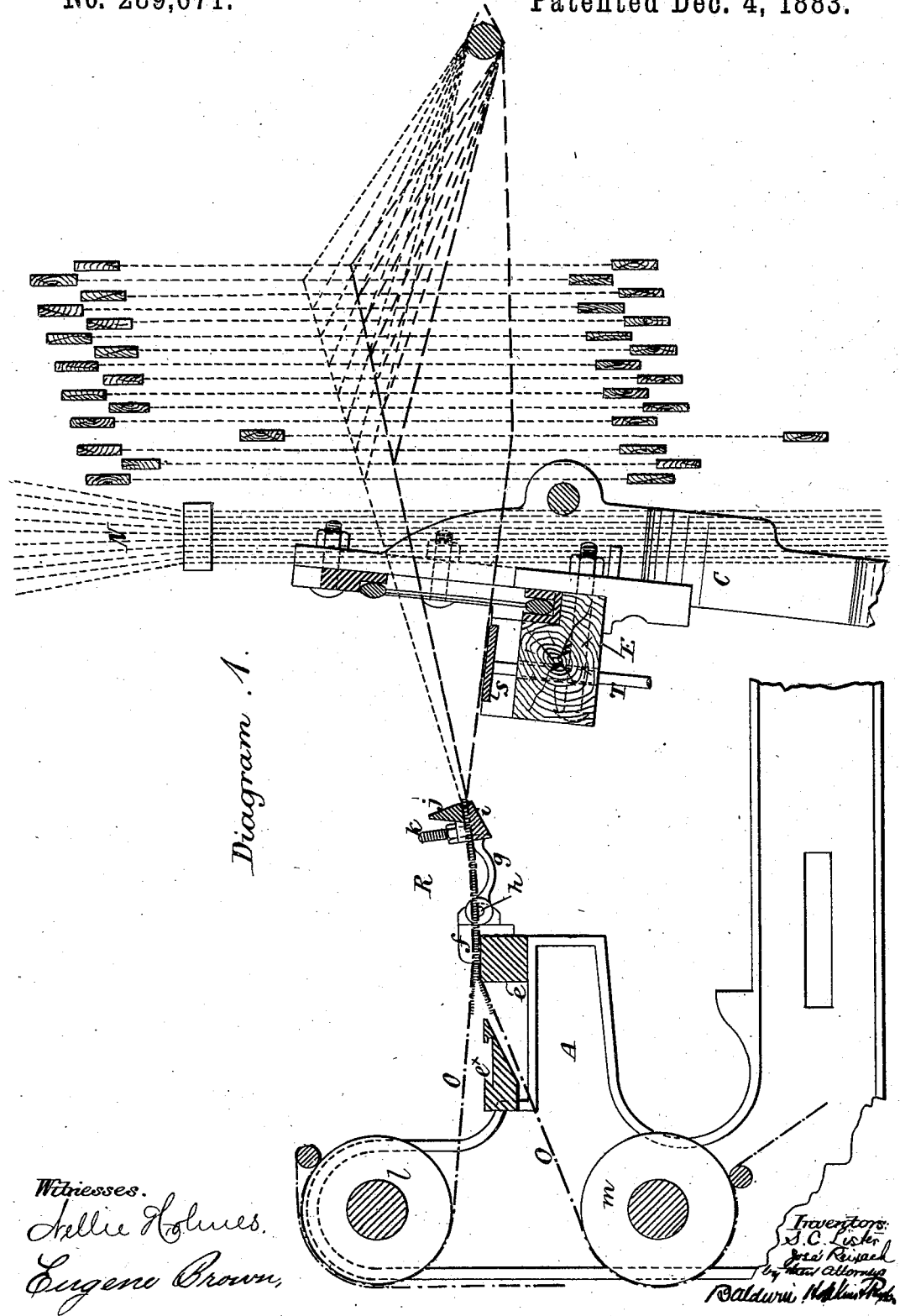

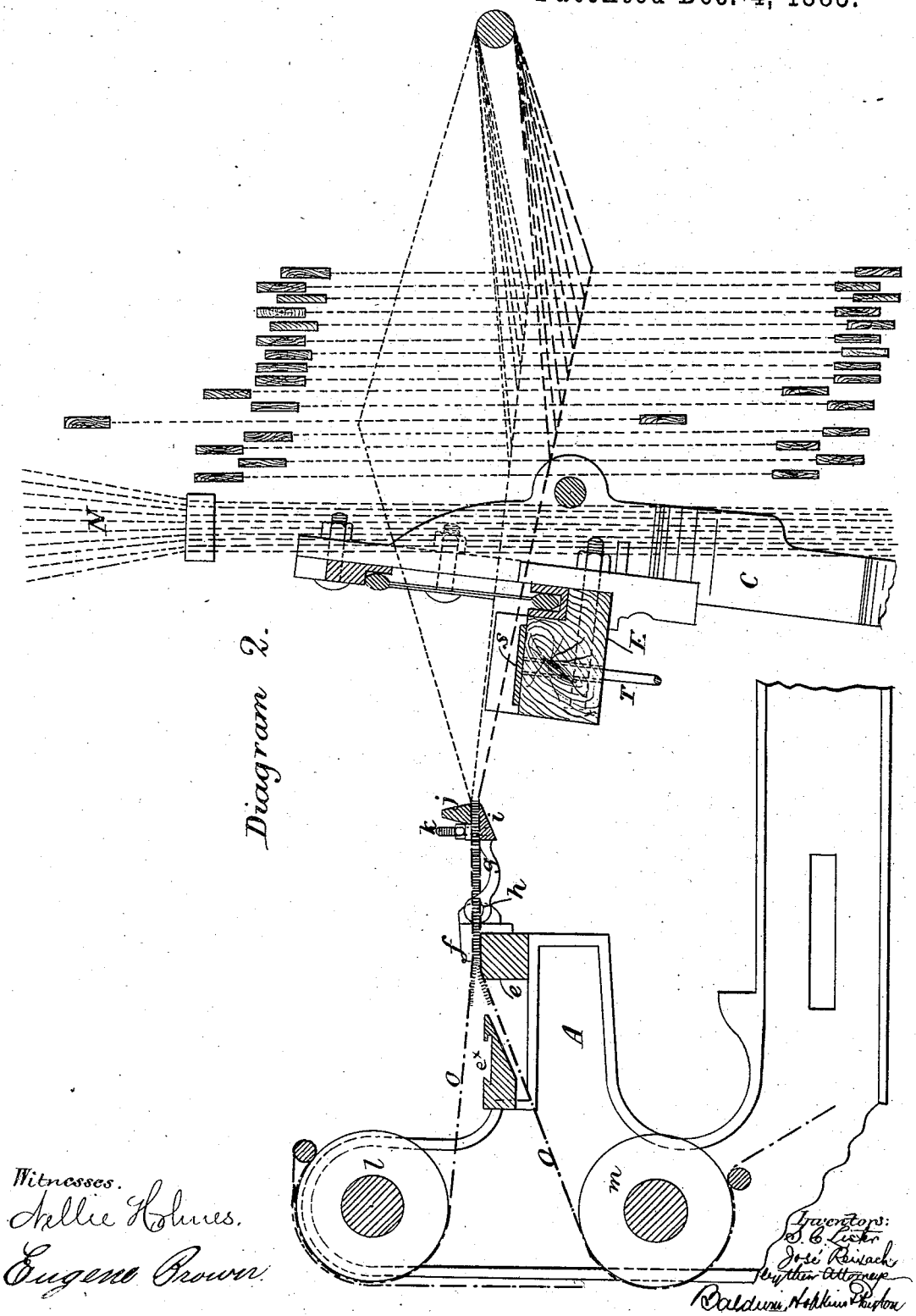

UNITED STATES PATENT OFFICE.

SAMUEL CUNLIFFE LISTER AND JOSÉ REIXACH, OF MANNINGHAM, COUNTY OF YORK, ENGLAND.

POWER-LOOM FOR WEAVING FIGURED DOUBLE-PILE FABRICS.

SPECIFICATION forming part of Letters Patent No. 289,671, dated December 4, 1883.

Application filed November 6, 1882. (No model.) Patented in England January 24, 1882, No. 366; in France July 24, 1882, No. 150,275, and in Germany August 10, 1882, No. 24,165.

*To all whom it may concern:*

Be it known that we, SAMUEL CUNLIFFE LISTER and JOSÉ REIXACH, subjects of the Queen of Great Britain, both residing at Manningham, in the county of York, England, have invented certain new and useful Improvements in Power-Looms for Weaving Figured Double-Pile Fabrics, (for which we have received Letters Patent in Great Britain, No. 366, dated January 24, 1882; in France, No. 150,275, dated July 24, 1882, and in Germany, No. 24,165, dated August 10, 1882,) of which the following is a specification.

Our said invention relates to power-looms for weaving figured velvets, plush, or any other pile fabrics, whereby two such pile fabrics are woven face to face at one operation, and are connected together by means of the pile-threads, upon severing which two separate and distinct cloths or pieces of pile fabric are produced. We effect the weaving of such fabrics in a single-shuttle loom, in which three or other number of picks of weft are first put into one cloth—say the top cloth—while the warps of the bottom cloth are all held down and at rest, and afterward three or other number of picks of weft are put into the bottom cloth, while all the top warps are held up and at rest. Looms working in this way have before been used to produce plush or velvets with a plain pile-surface; but they have not been adapted to produce a figured pile-surface, and no figured pile-surface could be produced in such looms, as in them the length of pile between the two cloths was controlled by giving out (for each beat up of the lay) a uniform length of all the pile warp-threads from the beam upon which such warp-threads were wound; but when weaving figured pile fabrics this means for obtaining a uniform length of pile cannot be used, as the several pile-warps are not taken up at a uniform rate, but some are taken up at different times from and more or less frequently than others. According to our invention, we employ a Jacquard machine for producing the figures by means of the pile-warp. Each thread of the pile-warp is put on a separate bobbin, which is fixed in a creel placed behind the loom, and the figure is produced by the jacquard acting on each thread of the pile-warp; but the ground is made by a set of cams or tappets which, also, in conjunction with a swinging pile-gage situated near to the fell of the fabric, regulate the length of the pile. The ground may be either twilled or otherwise. The swinging pile-gage is formed of two horizontal rails held at a short distance apart from one another, and the double-pile fabric is led between the rails. The healds belonging to the top cloth are kept at a higher level than those belonging to the bottom cloth, in place of keeping them on the same level, as heretofore, and, while weaving the top cloth, the healds belonging to the bottom cloth are kept at rest at the lower level—that is, below all the warps of the top cloth; and when weaving the bottom cloth those healds belonging to the top cloth remain at rest likewise at the upper level—that is, above all the warps of the bottom cloth—thus causing the two cloths to separate to the extent allowed by the swinging pile-gage, one cloth being thereby always held against the upper rail of the gage, and the other cloth against the lower rail of the gage. In this way the two cloths are always held at a uniform distance apart at the fell of the fabric, and consequently a uniform length of pile-warp is always taken up between them. Two rollers are placed at the back of the loom—one for each ground-warp. They keep the ground-warps for the top cloth at a distance apart from the ground-warps of the bottom cloth at the back of the loom. As the pile-gage is placed close to the fell of the fabric, a movable rail or shelf is attached in front of the reed of the lay for the shuttle to traverse over it, the object being to permit of the rail or shelf being made to descend as soon as it comes near the pile-gage, so that it may not strike against it, and to rise again to its proper level as the lay recedes after beating up, thereby keeping clear of the pile-gage each time the lay beats up. It also allows of the warps of the bottom cloth being held down at a lower level than they otherwise could be during the time the top cloth is being woven. The rail or shelf may be carried by two pivots close up to the reed and its front part only be raised or lowered; or the whole rail or shelf may be raised and lowered with a positive parallel motion, as shown in the drawings annexed.

In order that the said invention may be more readily understood, we shall now proceed to describe the several figures on the sheets of drawings hereunto annexed.

Figure 5:
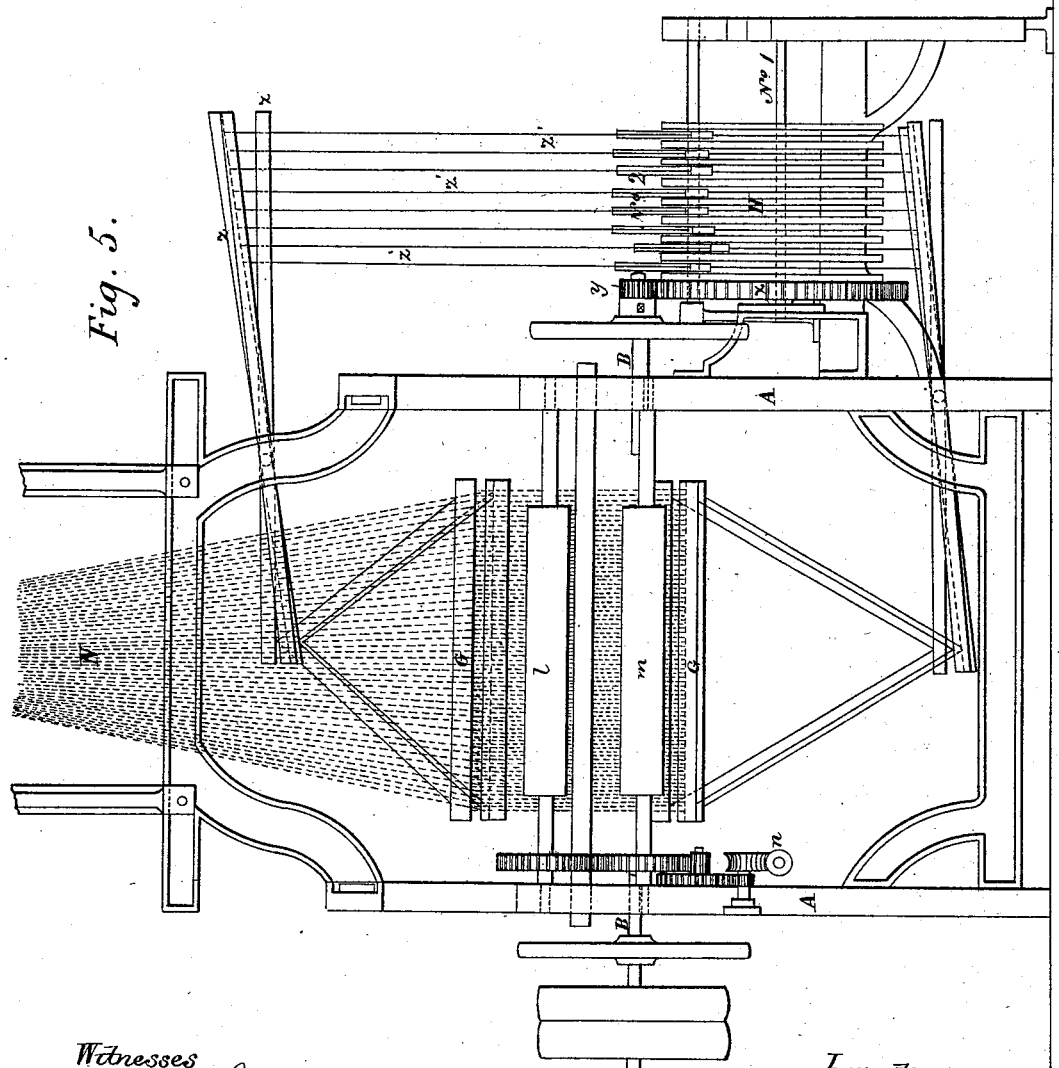

Figure 1 of the drawings represents a vertical section of the loom with the Jacquard mechanism removed. Fig. $1^x$ shows a vertical section of the Jacquard mechanism. Fig. 2 is a top view of the swinging pile-gage. Fig. 3 is a front view of the said gage partly in section. Fig. 4 is a transverse section of the said gage. Fig. 5 is a front elevation of the loom, showing the tappets in connection with the healds for working the ground-warps. The Jacquard mechanism, lay, and parts connected with the lay are omitted from this figure. Fig. 6 is a view in section showing the means by which an up-and-down motion is given to the shelf on the lay in front of the reed. Fig. 7 is a front elevation of the lay and of the means for operating the rising-and-falling shelf carried by it. Fig. 8 is a sectional elevation of part of one end of the loom with the mechanism employed for actuating the picker-staffs, and Fig. 9 is an elevation of so much of one side of the loom as is needed to show the action of this mechanism. Fig. $9^a$ is a detail view, partly in elevation and partly in section, showing on an enlarged scale the manner of supporting one of the picker-staffs and of securing the spring by which it is moved in one direction. Diagram No. 1 shows the position of the ground-warps when weaving the bottom cloth, and Diagram No. 2 the position of the ground-warps when weaving the top cloth.

A is the loom side; B, the crank-shaft.

C are the swords of the lay E. They are connected with the crank-shaft B by the crank-arm D, which gives motion to the lay E. F F are the ground-warps to form the backs of the pile fabrics, which warps are acted upon by the healds G, the said healds being worked by the tappets H, Fig. 5. The ground-warps of the top cloth are supplied by being drawn from the roller F', and those for the bottom cloth by being drawn from the roller $F^2$. The tappets are carried on a shaft No. 1 (see Fig. 5) on the opposite side of the loom to that shown at Fig. 1. It is driven continuously by a toothed wheel, $x$, upon the shaft gearing into a pinion, $y$, on the end of the driving-shaft B, as shown at Fig. 5. A row of levers No. 2, which are ranged parallel with the side of the loom, are acted upon by the tappets, there being one tappet for each lever, as described in the specification of a former patent, No. 270,321, granted to us. Each lever carries a truck or roller, which enters a cam-groove at the side of the tappet, and the lever is raised or lowered as the tappet revolves in accordance with the configuration of the cam-groove. The back ends of the levers turn upon a fulcrum carried by the framing, and at their front ends they are connected by wires $z'$ to the heddle-levers $z$, as shown at Fig. 5.

I is the creel, required to carry the bobbins J, upon which the threads of the pile K are wound.

L are weights to give tension to the pile-threads K.

M M are glass rods, over which the pile-threads are conducted to the harness N.

O O are the two cloths, face to face, bound by the pile-threads K.

The harness N, which raises and lowers the pile-threads, is lifted by the jacquard. The jacquard P may be of any ordinary construction of Jacquard apparatus. It is carried by the uprights $P^x$ from the frame of the loom. The harness N only of the jacquard is shown in Figs. 1 and 5. A vertical section of the Jacquard apparatus itself is shown at Fig. $1^x$. It is of ordinary construction, and its action is well understood.

The tappets H, Fig. 5, which work the healds G, are so constructed that while weaving the top cloth the healds belonging to the bottom cloth are kept at rest at the bottom—that is, at a lower level than all the warps of the top cloth, as shown at Diagram No. 2—and while weaving the bottom cloth the healds belonging to the top cloth are kept at rest at the top— that is, above the level of all the warps of the bottom cloth, as shown by Diagram No. 1. The warps of the bottom and top cloths, respectively, are thus always kept diverging one from the other as they recede from the pile-gage at the fell of the fabric, the top cloth being therefore held against the top rail of the said gage, and the bottom cloth against the bottom rail of the said gage, thus keeping the two cloths apart to the width allowed by the pile-gage, and consequently causing a uniform length of pile-warp to be taken up as sufficient weight or tension is put upon the ground-warps to prevent their being drawn away from the top and bottom rails, respectively, of the gage by the pull of the pile-warps upon them.

Two rollers, Q Q, are placed between the two sets of warps F, to keep them apart at the back of the loom. The fabric, as it is woven, after passing through the swinging pile-gage, passes over the velvet-rail $e$, where it is cut, in the well-known manner, by a knife carried by a slide which is moved to and fro across the loom in a groove in the knife-bar $e^x$, (shown in Diagrams Nos. 1 and 2,) as is described in Patent No. 268,418, granted to us. After the pile connecting the two cloths is severed, the upper cloth is led away over the roller $l$, and the lower cloth over the roller $m$. These two rollers are geared together, and they are both driven continuously by a train of toothed-wheel gearing, as shown at Fig. 5, from a worm, $m$, driven continuously from the picker-shaft of the loom, as is also described in the patent just mentioned.

The rising-and-falling rail or shelf S, Fig. 1 and Diagrams 1 and 2, in front of the reed, in the shuttle-race of the lay E, (better seen in Figs. 6 and 7 and Diagrams 1 and 2,) is connected by rods T to levers U, said levers being mounted on the shaft V, which is carried across the lay E. Upon the same shaft is mounted another lever, W, which is connected by the rod X to the lever Y, working on the fulcrum Y', which is fixed to the loom side A. The said lever Y is also connected by the rod $b$ to the lever $b'$. The lever $b'$ works on the stud $b^2$, carried by the stand $b^3$, fixed to the loom side A. The lever $b'$ receives its motion from the tappet Z, which is keyed on a toothed wheel, Z', both of which revolve upon the stud $d$, fixed on the loom side A. The tappet Z and wheel Z' receive their motion from the pinion $d'$, keyed on picking-shaft $d^2$, which is driven from the crank-shaft in the ordinary manner. The tappet Z is divided into six parts, each part giving the required movement to the swing-gage R at its proper time, as follows: While weaving the top cloth, the swing rail or shelf S in the lay E is kept down by the tappet Z for three successive picks of weft, in order to allow of the warps of the bottom piece being held down at a lower level than they otherwise could be, and in order also to keep it clear of the swing pile-gage when beating up, there being sufficient warp down to carry the shuttle. While weaving the bottom cloth, the shelf S is for three other successive picks of weft caused to rise just before each pick to support the shuttle in its flight across the lay, (there not being sufficient warp down to support it.) It is thus made to rise at the proper times by three projections, $Z^x$, on the tappet Z. (See Fig. 6.) When the shuttle has passed across, the shelf S is depressed to clear the swinging pile-gage R at the time of beating up. This depression of the shelf at the time when the lay beats up is caused by depressions $Z^{xx}$ in the tappet intermediate of the projections $Z^x$.

Fig. 2 is a top view of the swinging pile-gage R. $e$ is the velvet-rail, on which are fixed the temple-stands $f$. The said stands are provided with projections, on which the arms $g\ g$ from the pile-gage swing on studs $h$. $i\ j$ are the two rails forming the pile-gage which is close to the reed. Through this pile-gage the pieces pass as they are woven. $i$ is the bottom rail of the gage, and $j$ is the top rail. The distance between these two rails is adjustable. It is controlled by distance-pieces $k'$, introduced between them, and by the screws $k$ at the ends of the rails, as shown best in Fig. 3. By mounting the pile-gage so that it can swing, as above described, the top cloth always bears against the top rail of the gage with the same pressure as the bottom cloth bears against the bottom rail.

Any ordinary mechanism may be employed for throwing the shuttle across the loom each time that a shed is opened in the warps. In the arrangement shown at Figs. 7, 8, and 9, the lower end of each picker-staff is fixed in a metal socket, $n'$. This socket has standing out from it an axis, $o'$, which passes through the ends of a cylindrical box, $p'$. The box is carried at the end of a bracket, $r'$. Within the box is a coiled spring, $n''$. One end of the spring is fixed to the interior of the box, the other to the axis $o'$. The spring serves to draw back the picker-staff into the position shown at Figs. 7 and 8.

$s'$ is a spring stop or buffer for the lower end of the socket $n'$ to strike against each time that the socket is turned back by the spring in the box $p'$. The bracket $r'$ is free to turn on an axis, $t'$, which is in a line with the axis of the swords C, that carry the lay E. The socket $n'$ has an arm standing out from it, to which is secured a looped strap, $u'$. One end of a lever, $v'$, passes through the loop. The other end of the lever turns on a fixed pin at $w'$. On the lever is also a block, $x'$, against which a roller, $y'$, carried by an arm on the picking-shaft $d^2$, is caused to strike as the picking-shaft is revolved, and each time that it strikes this block it throws forward the picker-staff, and so throws the shuttle from the shuttle-box.

At Figs. 8 and 9 the shuttle-throwing mechanism on one side only of the loom is shown. The mechanism on the opposite side of the loom is constructed in the same manner.

Having now described and particularly ascertained the nature of the said invention and the manner in which the same is or may be used or carried into effect, we would observe, in conclusion, that we do not confine or restrict ourselves to the precise details or arrangements which we have had occasion to describe or refer to, as many variations may be made therefrom without deviating from the principles or main features of the said invention; but

What we consider to be novel and original and therefore claim as the invention is—

1. The combination of the swinging gage at the fell of the fabric and through which the fabric passes, means for supplying two sets of ground-warps, healds for the ground-warps of the top cloth, healds for the ground-warps of the bottom cloth, their actuating-cams and interposed levers and connecting-rods, all constructed to hold the warps of the top cloth at rest at a higher level than the warps of the bottom cloth while the bottom cloth is being woven, and to hold the warps of the bottom cloth at rest and at a lower level than the warps of the top cloth while the top cloth is being woven, means for holding a set of pile-warp bobbins, Jacquard mechanism for operating the pile-warps, a lay with shuttle-box at each end and mechanism for throwing a shuttle across from one shuttle-box to the other, and take-up mechanism for taking up the fabric as it is woven, substantially as described.

2. The combination of the swinging gage at the fell of the fabric and through which the fabric passes, healds for the ground-warps of the top cloth, healds for the ground-warps of the bottom cloth, their actuating cams and interposed levers and connecting-rods, Jacquard mechanism for operating the pile-warps, the lay with rising-and-falling shelf in front of the reed, and with a shuttle-box at each end, mechanism for throwing a shuttle from one shuttle-box to the other, and take-up mechanism for taking up the fabric as it is woven, substantially as described.

SAMUEL CUNLIFFE LISTER.
   JOSÉ REIXACH.

In presence of—
 H. F. KILLICK,
   *Notary Public, Bradford.*
 WM. THORNTON,
   *Solicitor's Clerk, Bradford.*